April 19, 1932.  E. P. BARTHOLOMAY  1,854,326
GAS METER
Filed Oct. 9, 1930
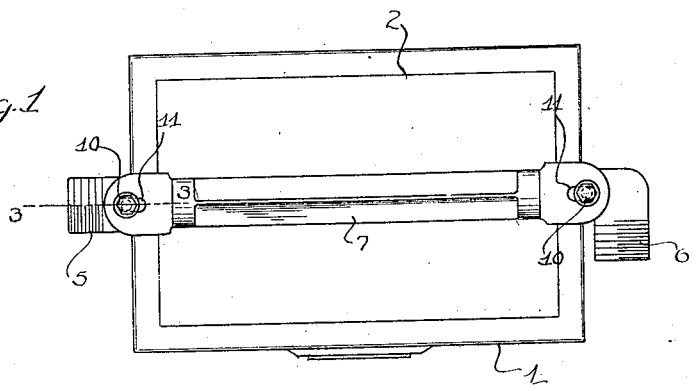
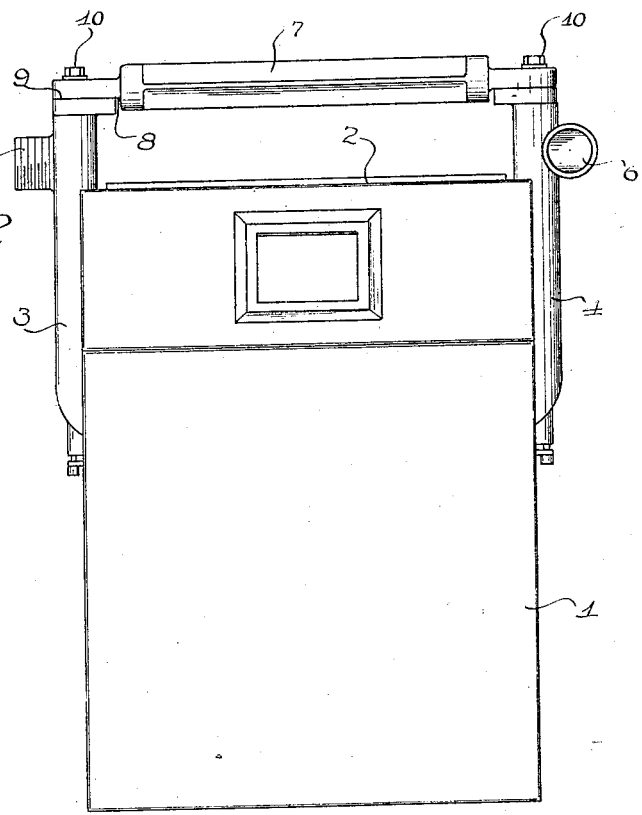
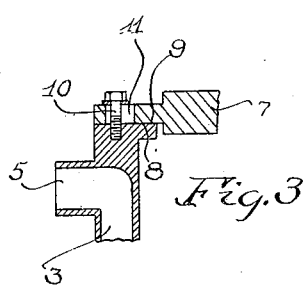
INVENTOR
Edward P. Bartholomay
BY
H. H. Simms
his ATTORNEY Patented Apr. 19, 1932

1,854,326

UNITED STATES PATENT OFFICE

EDWARD P. BARTHOLOMAY, OF ROCHESTER, NEW YORK

GAS METER

Application filed October 9, 1930. Serial No. 487,430.

The present invention relates to gas meters and more particularly to the type in which the meter casing has inlet and outlet posts on opposite sides provided with coupling parts. An object of the invention is to provide a novel means of rigidly connecting the two posts on opposite sides of the meter when the coupling parts on the posts open horizontally instead of upwardly.

To this and other ends, the invention consists of certain parts and combinations of parts, all of which will be hereinafter described, the novel features being pointed out in the appended claims.

In the drawings:

Fig. 1 is a top view of a gas meter embodying the present invention;

Fig. 2 is a front view of the gas meter shown in Fig. 1; and

Fig. 3 is a section on the line 3—3, Fig. 1.

Referring to the embodiment of the invention shown in drawings, 1 indicates the gas meter casing provided as usual with a removable top 2 and having on opposite sides inlet and outlet posts 3 and 4 respectively, projecting above the top 2 and provided with lateral or horizontal opening coupling parts 5 and 6 respectively to which the inside and the outside service pipes connect.

With the end in view of taking the strain off the connections between the posts and the meter casing while the service pipes are being connected to the posts, a rigid connection 7 is provided between the posts above the coupling parts 5 and 6 and in spaced relation to the meter top so that the latter may be removed without destroying the position of any of the meter connections. In this instance, this rigid connection is in the form of a bar having its ends flattened or machined on its underside as at 8 to rest upon flattened or machined parts 9 on the upper ends of the posts. Bolts 10 pass through the end portions of the connecting bar and are anchored in the posts, the bolt holes 11 in the bar being elongated to permit the bar to accommodate itself to different meters where slight differences will exist. The two flat surfaces 8 and 9 are arranged horizontally so that on tightening the bolts a rigid relation is established between the two posts and strains thereon are absorbed by the rigid connection instead of being transmitted to the soldered connections between the posts and the meter casing. The rigid connection permits the top of the meter casing to be removed.

What I claim as my invention and desire to secure by Letters Patent is:

1. In a device of the character described, a meter casing having inlet and outlet posts arranged on opposite sides thereof and projecting upwardly above the top of the meter, said posts each having a horizontally opening coupling part intermediate the upper ends of the posts and the top of the meter casing, of means rigidly and detachably connecting said posts across the top of the meter in spaced relation to said top and above said coupling parts.

2. In a device of the character described, a meter casing having inlet and outlet posts projecting above the meter and provided with horizontally arranged seats, of a rigid bar having horizontal seats at its ends engaging said seats on the post, and bolts passing through the bar into the posts to hold the bar to the posts.

3. In a device of the character described, a meter casing provided with a removable top and having inlet and outlet posts arranged on opposite sides thereof and projecting above the top of the casing, said posts having horizontally opening coupling parts intermediate the upper ends of the posts and the top of the meter casing and being provided above said coupling parts with seats, a rigid bar having end portions engaging the seats of the two posts and bolts passing through the bar into the posts.

4. In a device of the character described, a meter casing having inlet and outlet posts on opposite sides projecting above the top of the casing, and each provided with a seat at its upper end, and a coupling part below said seat, of a rigid connecting bar held to the seats on the two posts.

5. In a device of the character described, a meter casing having inlet and outlet posts arranged on opposite sides thereof and projecting upwardly above the top of the meter, horizontally arranged seats at the upper ends of said posts, of a rigid bar having horizontal seats at its ends engaging said horizontally arranged seats at the upper ends of said posts and secured thereto.

6. In a device of the character described, a meter casing provided with a removable top and having inlet and outlet posts arranged on opposite sides thereof and projecting above the top of the casing, said posts having horizontally arranged seats at their upper ends, horizontally opening coupling parts on said posts intermediate said seats and the top of said casing, a rigid bar having horizontal seats at its ends engaging said horizontally arranged seats at the upper ends of said posts and detachably secured thereto.

EDWARD P. BARTHOLOMAY.